(12) United States Patent
Kim

(10) Patent No.: US 8,606,742 B1
(45) Date of Patent: Dec. 10, 2013

(54) USER BEHAVIOR BASED CONTACT DECISIONS

(75) Inventor: Michael Kim, Walnut Creek, CA (US)

(73) Assignee: Google Inc., Mountain View, CA (US)

( * ) Notice: Subject to any disclaimer, the term of this patent is extended or adjusted under 35 U.S.C. 154(b) by 311 days.

(21) Appl. No.: 13/107,095

(22) Filed: May 13, 2011

(51) Int. Cl.
*G06N 5/00* (2006.01)

(52) U.S. Cl.
USPC .............................................. 706/54; 706/45

(58) Field of Classification Search
USPC .................................................... 706/54, 45
See application file for complete search history.

(56) References Cited

U.S. PATENT DOCUMENTS

| | | | |
|---|---|---|---|
| 5,005,143 | A | 4/1991 | Altschuler et al. |
| 6,513,013 | B1 | 1/2003 | Stephanou |
| 8,412,661 | B2 | 4/2013 | Brillhart et al. |
| 2003/0004909 | A1 | 1/2003 | Chauhan et al. |
| 2005/0138115 | A1 | 6/2005 | Llamas et al. |
| 2005/0187905 | A1 | 8/2005 | Dixon et al. |
| 2006/0235793 | A1 | 10/2006 | Walker et al. |
| 2006/0294037 | A1 | 12/2006 | Horvitz et al. |
| 2010/0070554 | A1 | 3/2010 | Richardson et al. |
| 2010/0268716 | A1 | 10/2010 | Degaugue et al. |
| 2011/0106895 | A1 | 5/2011 | Ventilla et al. |
| 2011/0261947 | A1 | 10/2011 | Benefield et al. |

OTHER PUBLICATIONS

Montgomery, et al., Predicting Online Purchase Conversion Using Web Path Analysis, Working Paper, 2002, pp. 1-53.*
Michael Kim, U.S. Appl. No. 13/107,047, entitled "Adaptive Contact Frequency," filed on May 13, 2011, 41 pages.
Michael Kim, U.S. Appl. No. 13/107,061, entitled "Adaptive Contact Window," filed on May 13, 2011, 40 pages.
Jon Duck-Schlossberg et al., "Battlefield Awareness and Data Dissemination Intelligent Information Dissemination Server," Final Technical Report, Air Forces Search Laboratory, Lockheed-Martin Corporation, Nov. 1999, 31 pages.
Derek E. Baird et al., "Neomillennial User Experience Design Strategies: Utilizing Social Networking Media to Support "Always On" Learning Styles," J. Educational Technology Systems, vol. 34(1), 2005-2006, pp. 5-32.
Alice Emily Marwick, "Selling Your Self: Online Identity in the Age of a Commodified Internet," Thesis for degree of Master of Arts, University of Washington, 2005, 192 pages.
Tracy Cohen et al., "Social Networks for Creative Collaboration," Proceedings of the 5th Conference on Creativity & Cognition (C&C'05), Apr. 12-15. 2005, London United Kingdom, pp. 252-255.
Etienne Wenger et al., "Technology for communities," CEFRIO Book Chapter, v 5.2, Jan. 18, 2005, 15 pages.
Stefan Decker et al., "The Social Semantic Desktop," DERI Technical Report May 2, 2004, DERI—Digital Enterprise Research Institute, May 2004, 7 pages.

* cited by examiner

*Primary Examiner* — Wilbert L Starks
(74) *Attorney, Agent, or Firm* — Fish & Richardson P.C.

(57) ABSTRACT

Methods, systems and apparatus, including computer programs encoded on a computer storage medium, for receiving aggregate user data, the aggregate user data corresponding to response rate of one or more answering users responding to requests, processing the aggregate user data to generate an analytical model, the analytical model comprising a plurality of states, a plurality of transitions between states, and data corresponding to a probability that an average answering user will respond to a request based on at least one of a state of the average answering user and a transition between states, receiving a request, identifying a plurality of answering users, processing the analytical model to identify a sub-set of answering users of the plurality of answering users, and transmitting the request to each answering user of the sub-set of answering users.

12 Claims, 6 Drawing Sheets

| Time | Monday | Tuesday | Wednesday | Thursday | Friday | Saturday | Sunday |
|---|---|---|---|---|---|---|---|
| 00:00 | 0.1 / 4.5 | 0.1 / 4.5 | 0.1 / 4.5 | 0.1 / 4.5 | 0.1 / 4.5 | 0.1 / 4.5 | 0.1 / 4.5 |
| 01:00 | 0.1 / 5.5 | 0.1 / 5.5 | 0.1 / 5.5 | 0.1 / 5.5 | 0.1 / 5.5 | 0.1 / 5.5 | 0.1 / 5.5 |
| 02:00 | 0.1 / 8.5 | 0.1 / 8.5 | 0.1 / 8.5 | 0.1 / 8.5 | 0.1 / 8.5 | 0.1 / 8.5 | 0.1 / 8.5 |
| 03:00 | 0.1 / 8.5 | 0.1 / 8.5 | 0.1 / 8.5 | 0.1 / 8.5 | 0.1 / 8.5 | 0.1 / 8.5 | 0.1 / 8.5 |
| 04:00 | 0.1 / 8.5 | 0.1 / 8.5 | 0.1 / 8.5 | 0.1 / 8.5 | 0.1 / 8.5 | 0.1 / 8.5 | 0.1 / 8.5 |
| 05:00 | 0.1 / 8.5 | 0.1 / 8.5 | 0.1 / 8.5 | 0.1 / 8.5 | 0.1 / 8.5 | 0.1 / 8.5 | 0.1 / 8.5 |
| 06:00 | 0.1 / 8.5 | 0.1 / 8.5 | 0.1 / 8.5 | 0.1 / 8.5 | 0.1 / 8.5 | 0.1 / 8.5 | 0.1 / 8.5 |
| 07:00 | 1.1 / 5.5 | 1.1 / 5.5 | 1.1 / 5.5 | 1.1 / 5.5 | 1.1 / 5.5 | 2.1 / 7.1 | 2.1 / 7.1 |
| 08:00 | 3.5 / 4.5 | 3.5 / 4.5 | 3.5 / 4.5 | 3.5 / 4.5 | 3.5 / 4.5 | 2.1 / 7.1 | 2.1 / 7.1 |
| 09:00 | 4.5 / 3.5 | 4.5 / 3.5 | 4.5 / 3.5 | 4.5 / 3.5 | 4.5 / 3.5 | 6.5 / 1.5 | 6.5 / 1.5 |
| 10:00 | 1.1 / 5.5 | 1.1 / 5.5 | 1.1 / 5.5 | 1.1 / 5.5 | 1.1 / 5.5 | 6.5 / 1.5 | 6.5 / 1.5 |
| 11:00 | 1.1 / 5.5 | 1.1 / 5.5 | 1.1 / 5.5 | 1.1 / 5.5 | 1.1 / 5.5 | 7.6 / 1.1 | 7.6 / 1.1 |
| 12:00 | 4.5 / 3.5 | 4.5 / 3.5 | 4.5 / 3.5 | 4.5 / 3.5 | 4.5 / 3.5 | 7.6 / 1.1 | 7.6 / 1.1 |
| 13:00 | 4.5 / 3.5 | 4.5 / 3.5 | 4.5 / 3.5 | 4.5 / 3.5 | 4.5 / 3.5 | 7.6 / 1.1 | 7.6 / 1.1 |
| 14:00 | 3.5 / 4.5 | 3.5 / 4.5 | 3.5 / 4.5 | 3.5 / 4.5 | 3.5 / 4.5 | 7.6 / 1.1 | 7.6 / 1.1 |
| 15:00 | 1.1 / 5.5 | 1.1 / 5.5 | 1.1 / 5.5 | 1.1 / 5.5 | 1.1 / 5.5 | 7.6 / 1.1 | 7.6 / 1.1 |
| 16:00 | 1.1 / 5.5 | 1.1 / 5.5 | 1.1 / 5.5 | 1.1 / 5.5 | 1.1 / 5.5 | 7.6 / 1.1 | 7.6 / 1.1 |
| 17:00 | 1.1 / 5.5 | 1.1 / 5.5 | 1.1 / 5.5 | 1.1 / 5.5 | 1.1 / 5.5 | 7.6 / 1.1 | 7.6 / 1.1 |
| 18:00 | 3.5 / 4.5 | 3.5 / 4.5 | 3.5 / 4.5 | 3.5 / 4.5 | 1.1 / 5.5 | 3.5 / 4.5 | 3.5 / 4.5 |
| 19:00 | 3.5 / 4.5 | 3.5 / 4.5 | 3.5 / 4.5 | 3.5 / 4.5 | 1.1 / 5.5 | 3.5 / 4.5 | 3.5 / 4.5 |
| 20:00 | 7.6 / 3.5 | 7.6 / 3.5 | 7.6 / 3.5 | 7.6 / 3.5 | 1.1 / 5.5 | 1.1 / 5.5 | 7.6 / 3.5 |
| 21:00 | 8.5 / 2.5 | 8.5 / 2.5 | 8.5 / 2.5 | 8.5 / 2.5 | 1.1 / 5.5 | 1.1 / 5.5 | 8.5 / 2.5 |
| 22:00 | 8.5 / 2.5 | 8.5 / 2.5 | 8.5 / 2.5 | 8.5 / 2.5 | 1.1 / 5.5 | 1.1 / 5.5 | 8.5 / 2.5 |
| 23:00 | 5.1 / 5.1 | 5.1 / 5.1 | 5.1 / 5.1 | 5.1 / 5.1 | 1.1 / 5.5 | 1.1 / 5.5 | 5.1 / 5.1 |

FIG. 5

USER BEHAVIOR BASED CONTACT DECISIONS

BACKGROUND

This specification generally relates to computer software systems and methods, in particular, systems and methods for adapting a contact frequency within a social networking service.

Computers and mobile devices, such as cellular phones and personal digital assistants, have become increasingly interconnected due to the widespread availability of wired and wireless connections to communications networks such as the Internet. Even in the earliest days of the ARPANET, users took advantage of such interconnectivity to communicate with one another through early forms of email. As email grew in availability and popularity, email "lists" became a popular tool for broadcasting messages to predefined groups of recipients. World wide web based discussion groups (i.e., also known as clubs) have also provided a way for groups of people to associate around a topic. Through the use of web server programming, the idea of discussion groups and discussion threads has been extended to provide users with the ability to subscribe to secured discussion forums that are, in some cases, moderated by other users.

Another variant of Internet based communication forums are the web-based "social network" applications, in which a number of users are able to find each others' accounts and voluntarily become "friends" or "followers" of each other's posted messages. Users generally post brief messages about their status, mood, activities, and such, and their friends and followers can read and optionally reply to those messages. As such, friends may stay abreast of each other's' activities as a tool for maintaining their social bonds.

Other social networking services have developed to connect users with other users of the social networking service (e.g., friends or friends-of-friends). An example social networking service enables users to post questions to be answered by other users. For example, a user can submit questions via a website, email or instant messenger and the social networking service identifies and facilitates a live chat or email conversation with one or more topic experts in the user's extended social network. The frequency at which a user is requested to provide a response to a question can influence the user's desire to participate in the social networking service.

SUMMARY

In general, innovative aspects of the subject matter described in this disclosure may be embodied in methods that include the actions of receiving aggregate user data, the aggregate user data corresponding to response rate of one or more answering users responding to requests, processing the aggregate user data to generate an analytical model, the analytical model comprising a plurality of states, a plurality of transitions between states, and data corresponding to a probability that an average answering user will respond to a request based on at least one of a state of the average answering user and a transition between states, receiving a request, identifying a plurality of answering users, processing the analytical model to identify a sub-set of answering users of the plurality of answering users, and transmitting the request to each answering user of the sub-set of answering users.

These and other implementations may each optionally include one or more of the following features. For instance, the actions further include: determining a response of a particular answering user of the sub-set of answering users to the request, modifying the analytical model based on the response to provide a modified analytical model, the modified analytical model being specific to the particular answering user, and in response to receiving a subsequent request, determining whether to transmit the subsequent request to the particular answering user based on the modified analytical model; modifying the analytical model includes: determining a particular state that the particular answering user was in when the particular answering user provided the response, and updating data corresponding to the state based on the response; the data includes count data including a number of successful requests and a number of unsuccessful requests corresponding to requests issued during each of the plurality of states and each of the plurality of transitions; processing the analytical model includes: for each answering user of the plurality of answering users, determining that the answering user is in one of a particular state or a particular transition, determining a number of successful requests and a number of unsuccessful requests based on the one of the particular state or the particular transition, calculating a probability based on the number of successful requests and the number of unsuccessful requests, and including the answering user in the sub-set of answering users based on the probability; including the answering user in the sub-set of answering users based on the probability includes: comparing the probability to a threshold probability, and determining that the probability is greater than or equal to the threshold probability; including the answering user in the sub-set of answering users based on the probability includes: generating a random number, and determining that the random number is less than or equal to the probability; including the answering user in the sub-set of answering users based on the probability further includes: comparing the probability to a threshold probability, and determining that the probability is less than the threshold probability, wherein generating the random number occurs in response to determining that the probability is less than the threshold probability; a state includes at least one of an activity that a user can be engaged in; and a state includes at least one of writing an email, browsing the Internet, browsing a specific site on the Internet, being idle, talking on a telephone, and writing a document.

Other implementations of this aspect include corresponding systems, apparatus, and computer programs, configured to perform the actions of the methods, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 5 depicts an example user class table in accordance with implementations of the present disclosure.

Like reference numbers represent corresponding parts throughout.

DETAILED DESCRIPTION

Implementations of the present disclosure are generally directed to systems and techniques for determining when a user should be provided a request. Requests include questions provided by users of the system. The requests are provided to answering users who can provide responses. Responses can include answers to the questions. Answering users are a subset of all the users of the system who are determined to be more likely to be able and willing to answer the question. One or more analytical models can be used to determine which users are more likely to provide responses. The analytical models can be modified for each particular user to more effectively determine whether the particular user should be included in as an answering user. The analytical models can be based on factors such as a number of previous requests provided to the user in a time interval, a time of day of the week, and a state of activity of the user.

Figure 1:
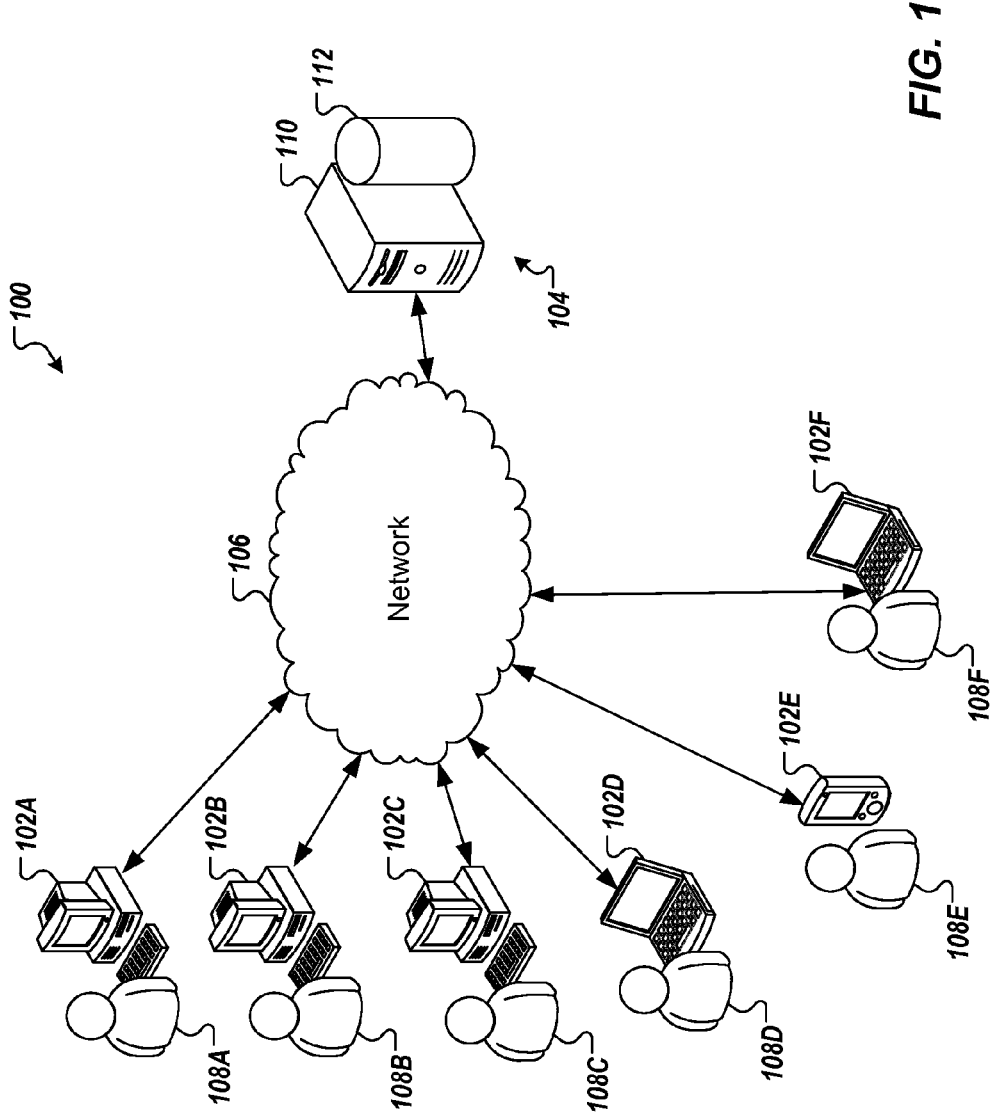
FIG. 1 depicts an example system that can execute implementations of the present disclosure.

FIG. 1 depicts an example system 100 that can execute implementations of the present disclosure. The system 100 includes computing devices 102A-102F that can each communicate with one or more server systems 104 over a network 106. Each of the computing devices 102A-102F includes an associated user 108A-108F, respectively. The network 106 can include a large computer network, such as a local area network (LAN), wide area network (WAN), the Internet, a cellular network, or a combination thereof connecting any number of mobile computing devices, fixed computing devices, and server systems. The server system 104 includes a computing device 110 and a machine-readable repository, or database 112. It is appreciated that although a single server system 104 is depicted, the single server system can represent one or more server systems.

In the example system 100, the computing devices 102A-102C are illustrated as desktop-type computing devices, the computing devices 102D, 102F are illustrated as laptop-type computing devices, and the computing device 102E is illustrated as a mobile computing device. It is appreciated, however, that the computing devices 102A-102F can each include any type of computing device such as a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

As discussed herein, the system 100 enables one or more users to submit requests and enable one or more other users to receive the requests and submit responses. For example, the computing devices 102A-102F enable the respective users 108A-108F to submit a request in the form of a question to the server system 104 and/or submit a response to a question to the server system 104. The requests and responses can be electronically stored in memory. In some implementations, the requests and responses can be stored on one or more of the computing devices 102A-102F and/or the server system 104.

By way of non-limiting example, the user 108A can use the computing device 102A to submit a request to the server system 104 over the network 106. The request includes a question. The server system 104 can identify one or more of the other users 108B-108F as answering users. For example, all of the users 108B-108F can be identified as answering users, or a subset of the users 108B-108F can be identified as answering users. As discussed in further detail herein, the server system can process one or more analytical models to identify answering users. The server system 104 can transmit the request to the computing devices associated with the answering users. The answering users can each provide a response to the server system 104. The response can include an active response, such as an answer to the question, an indication that the user does not know the answer to the question, or that the user declines to provide an answer. The response can include a passive response, such as the answering user ignoring the request. The server system 104 can receive the responses of one or more answering users and provides the responses or a subset of the responses to the user 108A through the computing device 102A.

Figure 2:
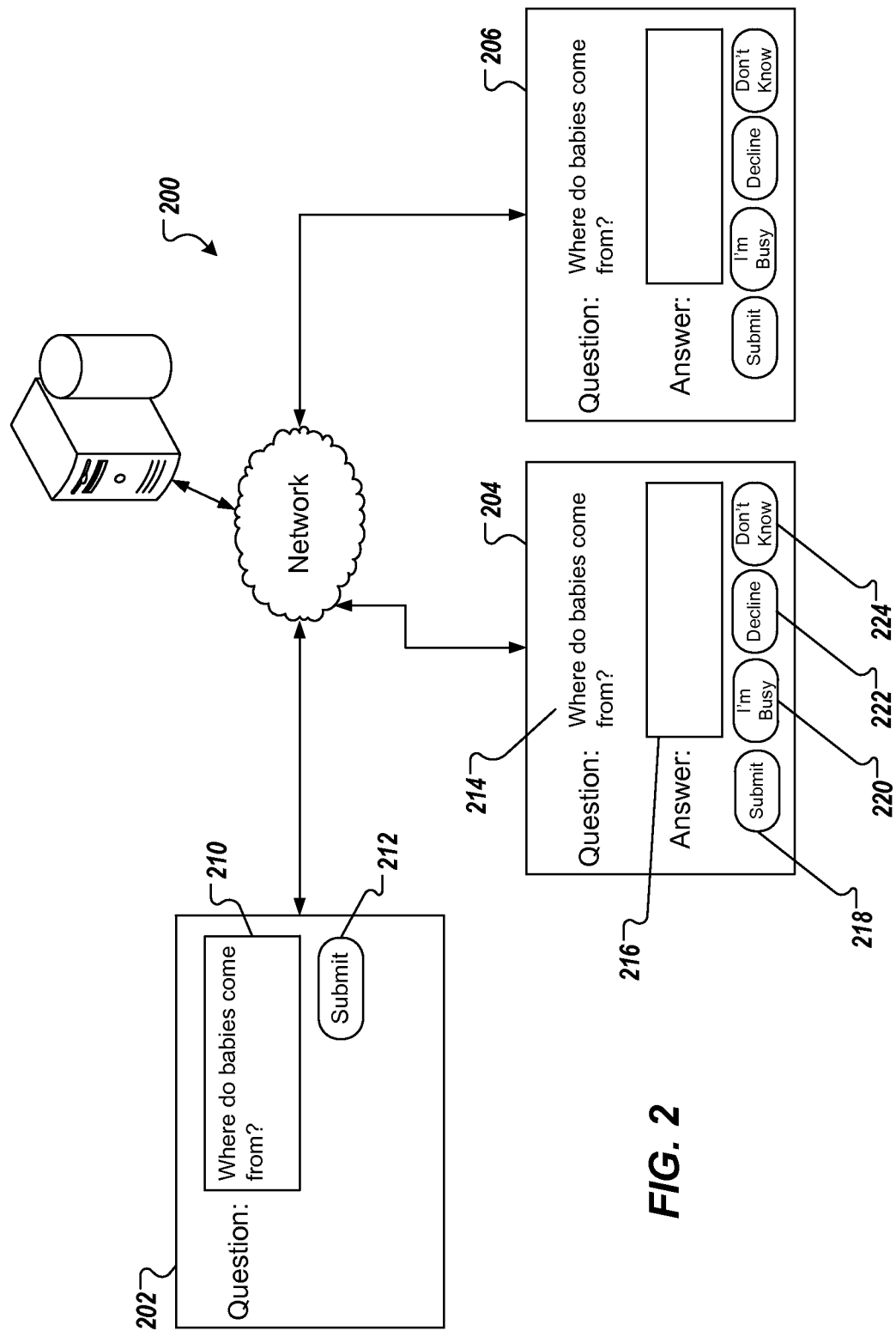
FIG. 2 depicts example screenshots in accordance with implementations of the present disclosure.

FIG. 2 depicts example screenshots in accordance with implementations of the present disclosure. Screenshot depicts an example interface 202, through which a user can submit a request. For example, the interface 202 may be displayed to user 108A on the computing device 102A. The interface 202 can include a text box 210, within which the user 108A can input a question, and a button 212 that can be selected to submit the question to a server system. The text box 210 enables the user 108A to enter any type of question user 102B wants to ask. The server system can receive the question, can identify a group of answering users, and can contact the answering users who might provide respective answers to the question. The answering users can be determined based on various factors, discussed in greater detail below.

The answering users can receive an email or a notification providing the request and/or indicating the existence of the request. The system can provide an interface, such as interfaces 204, 206, which provide the question 214 and a text box 216 where the users can type an answer. For example, the users 108B, 108C can be identified as answering users and the interfaces 204, 206 may appear on the respective computing devices 102B, 102C. In some implementations, the interfaces 204, 206 can provide the question 214 without providing any information about the user who submitted the question. In some implementations, the interfaces 204, 206 can provide additional information regarding the question, such as an identifier associated with the requesting user (e.g., the user 108A) and/or a time/date, at which the question was submitted. The interfaces 204, 206 can also include a button 218 to submit an answer, as well as other buttons 220, 222, 224 or inputs that enable the answering user to indicate that they do not know the answer to the question (button 224), do not want to answer the question (button 222), or that they are currently busy (button 220). In some implementations, an empty answer can be regarded as the user declining to answer the question. For example, a passive non-response can include the answering user not providing any input for a threshold period of time after the question is presented to the answering user (i.e., the answering user simply ignores the question).

As discussed in further detail herein, the server system 104 can update one or more analytical models based on the responses provided by the answering users. For example, one or more base analytical models can be generated based on answer history data corresponding to a plurality of answering users. The base analytical model can be implemented on a per user basis to determine whether a particular user should be identified as an answering user. For each user, the base analytical model can be modified based on responses that the particular user provides to provide a modified analytical model. Each modified analytical model is provided as a user-specific analytical model. Consequently, each user can be associated with one or more user-specific analytical models, which can be processed by the server system 104 to determine whether to identify the user as an answering user under certain circumstances and to transmit a question to the user. In some implementations, and as discussed in further detail herein, the analytical models include an analytical model that describes a probability that a user will respond to a request based on response rates over one or more time intervals, one or more analytical models that describe a probability that a user will respond to a request based on a time of day, and an analytical model that includes a plurality of states, a plurality of transitions between states and data corresponding to a probability that a user will respond to a request based on at least one of a state and a transition.

An analytical model can describe the probability that a user will respond to a request based on response rates over one or more time intervals. As a user receives more and more requests to provide answers to questions over a given time interval, there may come a point for each user that the user no longer wants to answer more questions for each time interval. Thus, an analytical model can reflect the probability that an additional question will be answered by the user, or whether a user may have reached a personal limit for wanting to answer questions for the time interval. For example, some users may be happy to respond to one or two requests within a given time interval, but may become less inclined to respond to an increasing number of requests for the given time interval.

For example, a time interval can be one day (e.g., the past 24 hours). A response rate can be calculated for each number of requests the user has received previously in the time interval. For example, a probability can be calculated for the user having received no requests yet for the day. Another probability can be calculated for the user having received one question for the day. Still another probability can be calculated for the user having received two requests, and so forth. Based on the historical response rates of users for different numbers of requests received in the given time period (e.g., one day), a base analytical model can be produced. The base analytical model can provide the probability that an average user will respond to a request based on the number of requests already issued to the user for the given time period.

The analytical model can include multiple sub-models, each sub-model corresponding to a different time interval. By way of non-limiting example, the analytical model can include a first sub-model corresponding to one day, a second sub-model corresponding to three days, and a third sub-model corresponding to one week. Each of the sub-models can be generated based on historical user response information, as discussed above.

Figures 3, 4:
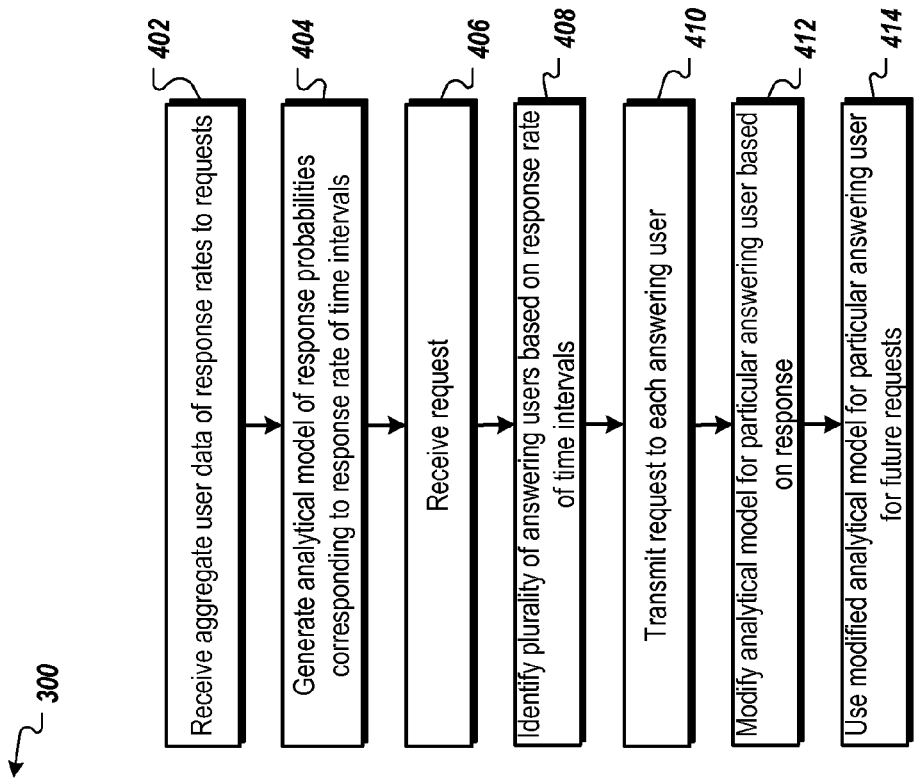
FIG. 3 depicts an example interval table in accordance with implementations of the present disclosure.
FIG. 4 is a flowchart illustrating an example process for adaptive contact frequency in accordance with implementations of the present disclosure.

FIG. 3 depicts an example interval table 300 in accordance with implementations of the present disclosure. The example interval table 300 can embody an analytical model or a sub-model of the analytical model, and can correspond to a given time interval (e.g., one day). The example interval table 300 can be used to determine response rates for previous questions received in the given time period (e.g., the past day, or 24 hours). The response rates are used to indicate the probability that a user will respond to a request. As used herein, the terms response rate and probability are interchangeable. A first column 302, labeled "# of previous requests," can correspond to the number of previous requests (R) provided to the user in the past 24 hours. A second column 304, labeled "Pseudo-Count Successful," includes a count value (S) correlating the number of requests in the first column 302 with successful responses in the past 24 hours. A third column 306, labeled "Pseudo-Count Unsuccessful," includes a count value (U) correlating the number of requests in the first column 302 with unsuccessful responses in the past 24 hours. A probability that an answering user will respond to a new request can be calculated based on the following example relationship:

$$P_{t1}=S/(S+U)$$

where t1 indicates the particular time interval of the interval table 300.

The pseudo-counts for successful and unsuccessful requests (i.e., S and U, respectively) can have initial values that are generated based on historical user data for all answering users. The example interval table of FIG. 3 can be a base analytical model, or base sub-model that uses initial count values generated from the historical user data. For example, and using the example values provided in the interval table of FIG. 3, an average user can have a response rate when having received no requests for the past 24 hours (i.e., $t_1$=24 hours) of:

$$P_{t1}=S/(S+U)=8.1/(8.1+4.5)=0.64$$

or 64%. Using the example values provided in the interval table of FIG. 3, the response rate for an average user having received one request in the past 24 hours can be 61%, two requests, 57%, down to, for this example interval table, four requests at 50%.

For each user, the base analytical model can be modified based on responses that the particular user provides. For example, each time the user answers a question provided in a request, the corresponding pseudo-count successful column (S) can be incremented by 1. For example, if the user has not received any requests in the particular interval (e.g., past 24 hours) and answers a question provided in a request, the pseudo-count successful (S) for 0 previous requests can be incremented from 8.1 to 9.1. If the user declines to answer the question, however, the corresponding pseudo-count unsuccessful (U) for 0 previous requests can be incremented by 1. Accordingly, if the particular user has not received any requests within the time interval and does not answer a question provided in a request, the pseudo-count unsuccessful (U) for 0 previous requests can be incremented from 4.5 to 5.5. By incrementing either the pseudo-count successful (S) or pseudo-count unsuccessful (U), the response rate for the corresponding number of previous requests is adjusted, or modified, for the particular user. The change in the response rate will be reflective of the particular user's probability in answering a question based on response rate of a particular time interval.

The incrementing of successful and unsuccessful pseudo-counts can be based on positive and negative responses, respectively. Positive responses can include an answering of a question. Positive responses can also include an attempt at answering a question, even if the question is not successfully answered. For example, an indication that a user does not know the answer to a question can be considered a positive response. Negative responses can include an indication that the user is busy or an indication that the user declines to answer the question. Responses can also be neutral, such as passive responses, including the user ignoring the question.

Neutral responses can also be used to increment the unsuccessful pseudo-count, or can be determined to affect neither pseudo-count.

Thus, the probability that the particular user will respond to a question based on the number of previous requests received in a time interval can be used to determine whether a new request should be provided to the user. For example, a threshold probability can be used to determine whether the system should provide a new request to each user. For example, a group of answering users can be selected based on comparing respective probabilities calculated from respective interval tables to the threshold probability. By way of non-limiting example, the system can receive a request from a questioning user (e.g., the user 108A submits a question that is received by the server system 104 of FIG. 1). The system can recognize that other users (i.e., potential answering users) have been made available to provide respective responses to requests (e.g., question). For each potential answering user, the probability that the user will currently respond to a request can be determined from an interval table, such as the example interval table of FIG. 3. If the probability for a particular user is less than the threshold probability, an initial determination is made that the request should not be sent to the particular user. If the probability for a particular user is equal to or greater than the threshold probability, the request is sent to the particular user.

In some implementations, and if an initial determination is made that the request should not be sent to a particular user, a secondary determination can be made. The secondary determination can be based on the probability calculated for the particular user. That is, a random number (r) between 0 and 100 can be generated. If the random number (r) is less than or equal to the calculated response rate (which was already determined to be less than the threshold probability, as discussed above), the secondary determination can be made that the request is to be sent to the particular user. If the random number (r) is greater than the calculated response rate, the secondary determination can be made that the request should not be sent to the particular user.

In some implementations, the analytical model can include several interval tables, each interval table corresponding to a different time interval. In this sense, each interval table can be deemed to be a sub-model of the analytical model. For example, the analytical model can include a interval tables for the past 24 hours, the past 3 days and the past week. The interval tables can be similar to the example interval table 300 of FIG. 3. The interval tables can include more rows for more numbers of previous requests, as necessary. Requests for each of the different time intervals can be provided in a manner similar to the interval table 300 discussed above, such as providing a new request to a user if a corresponding response rate is above a threshold rate (i.e., threshold probability). Each of the interval tables can also be incremented in a similar manner depending on the response of the particular user.

The system can incorporate the multiple interval tables into one analytical model to determine whether to provide a new request to a particular user. For example, the system can provide the new request to the user if the system would provide the new request to the user using a response rate calculation under any of the interval tables. By way of non-limiting example, a particular user may have received 1 request in the past 24 hours, 5 requests in the past 3 days, and 10 requests in the past week. The system can initially refer to the interval table for the past 24 hours to determine whether the response rate for 1 previous request is above the threshold rate. The system can do the same for 5 previous requests on the table for the past three days and 10 previous requests for the table for the past week. If any of the interval tables corresponding to each of those numbers of previous requests provides a response rate above the threshold rate, the system provides the request to the particular user. If none of the response rates are above the threshold rate, the system can make a secondary determination, as discussed above, by generating random numbers for each of the interval tables to determine whether the request should be provided. If any of the random numbers generated are below the respective response rates, the request can be provided to the user. In some implementations, the request can be provided to the particular user only if the response rates of the respective interval tables are all greater than the threshold rate. In some implementations, the request can be provided to the particular user if at least a threshold fraction of the response rates of the respective interval tables are greater than the threshold rate (e.g., at least two out of three).

FIG. 4 is a flowchart illustrating an example process 400 for adaptive contact frequency in accordance with implementations of the present disclosure. In some implementations, actions represented in the example process 400 may be performed using one or more computing devices (e.g., the server system 104 of FIG. 1).

Aggregate user data of response rates to requests is received (402). The aggregate user data of response rates to requests can be based on historical user data. For example, a sample of historical data can be used to determine average response rates for all users in the sample when having received no previous requests in a given time interval. An average response rate can also be determined for all users in the sample after having received one previous request in the given time interval, two previous requests, and so forth.

An analytical model of response probabilities corresponding to response rates of time intervals is generated (404). The analytical model can include one or more interval tables of response rates, each interval table corresponding to a different time interval, as discussed above. The analytical model can be used as a base model of probabilities for each user before a particular user provides any responses that can be used to modify the model. In some implementations, more than one base model can be generated, for example, by information provided by the user regarding a willingness to respond to requests more or less frequently.

A request is received (406). As discussed, a request can include a question provided by a user to be provided to answering users for a response. The response can include an answer to the question. A plurality of answering users is identified based on one or more response rates of respective one or more time intervals (408). By referring to the analytical model of response rates, users who are more likely to respond to the question can be determined. Answering users can be those identified by using the analytical model to have a response rate, or probability above a threshold probability. In some implementations, a subset of the answering users can be identified, for example, if the number of answering users exceeds a threshold number. The subset can be determined by identifying answering users with a greater likelihood to respond to the request. Alternatively or additionally, a random or other subset of the answering users can be identified.

The request is transmitted to each answering user (410). The request is transmitted to each of the users that have been determined to be likely to respond to the request. In some implementations, where a subset of the answering users is determined for providing the request, the request is transmitted to each of the answering users in the subset.

The analytical model is modified for each particular answering user based on the particular user's response (412).

Based on the user's response to the request, the analytical model can be modified. Positive responses can be used to increment a corresponding successful pseudo-count (S) for each of the one or more time interval tables, while negative responses can be used to increment a corresponding unsuccessful pseudo-count (U) for each of the one or more time interval tables. Neutral responses can be used to also increment the corresponding unsuccessful pseudo-count (U) or can be ignored.

The modified analytical model is used for the particular answering user for future requests (414). As the base analytical model is modified for each particular answering user, the modified analytical model can more accurately provide a probability of the particular user's response rate. Thus, when a future request is received the modified analytical model can be used to determine whether to identify the particular user as an answering user. The modified analytical model can then be further modified based on the user's response to such future requests.

In some implementations, an analytical model can describe a probability that a user will respond to a request based on a time of day, and/or day of week. A user may be more likely to respond to requests at particular times of day. For example, a user is unlikely to respond to a request when the user is sleeping, which may occur at a relatively regular time of day. Some users may be unlikely to respond to requests while working, while other users may be more likely to respond to requests while working. Further, different users may have different work and sleep schedules. As another example, a user may be less likely to respond to a request on a weekday, and may be more likely to respond on a weekend. Thus, an analytical model can reflect the probability that a request will receive a response from a particular user based on the time of day and/or day of the week.

Similar to the base analytical model for response rates based on previously received requests, a base analytical model can be generated based on time of day of the week. For example, FIG. 5 depicts an example table 500 in accordance with implementations of the present disclosure. FIG. 5 includes a time of day column 502 and day of the week columns 504. Within each cell is an example base response rate for that time of day of the week. The format S/U can be similar to the analytical model based on previously received requests, using successful and unsuccessful pseudo-counts. For example, a cell 506, corresponding to the "Monday" column and the "00:00" row can represent pseudo-counts for requests transmitted between midnight and 1 AM on Mondays. The number "0.1" can be the successful pseudo-count (S), and the number "4.5" the unsuccessful pseudo-count (U). Thus, the response rate for the average user between midnight and 1 AM on Monday can be 0.1/(0.1+4.5), or 0.02, or 2%. This may reflect, for example, that the average user may be sleeping by that time on Monday night.

The example table 500 of FIG. 5, indicates that, on Mondays, the average user may be most responsive to requests 9 AM and 10 AM, between noon and 2 PM, and between 8 PM and 11 PM. This may reflect that the average user is responsive to requests at the beginning of a standard 9-5 work day, at an average lunch time, and in the evening after work.

In some implementations, more than one base analytical model may be generated. For example, several user classes can be defined, each with a base analytical model. A user class can be a subset of the users with a common characteristic, such as a general schedule. Example user classes can include standard 9-5 employed, night owls, "graveyard shift" workers, and/or college students. Each of the user classes can have base analytical models that provide a starting point for the average person in the user class. For example, FIG. 5 can depict an example 9-5 employed. Such a model may not be a useful starting point for a "graveyard shift" worker, who may be sleeping during the day and working at night. Thus, such a worker may start with a base analytical model generated specifically for "graveyard shift" workers. Any number of such user classes and base analytical models can be defined and generated.

In determining whether to transmit a request to a particular user, the system can generate a response rate (i.e., probability) based on the day and the time of day that the request is received by the system, the class of user, and the analytical model (e.g., the table 500 of FIG. 5). For example, a request can be received by the system at 12:15 PM on a Friday. The system can identify a group of potential answering users as users that have been made available to provide respective responses to requests. For each user, the system can determine a class of the user. For example, one user can be determined to be a "9-5 employed" user and another user can be determined to be a "graveyard shift" user. For the respective user, the system can access a corresponding table to determine the probability that the user will respond to a request. Continuing with the example above, and for the particular user being a "9-5 employed" user, the example table 500 of FIG. 5 can be accessed. In this case, the values S, U corresponding to 12:15 PM on a Friday can be retrieved from a cell 508, where S is equal to 4.5 and U is equal to 3.5. The response rate, or probability is consequently calculated as 0.5625 (56.25%). If the probability for a particular user is less than a threshold probability, an initial determination is made that the request should not be sent to the particular user. If the probability for a particular user is equal to or greater than the threshold probability, the request is sent to the particular user.

In some implementations, and if an initial determination is made that the request should not be sent to a particular user, a secondary determination can be made. The secondary determination can be based on the probability calculated for the particular user. That is, a random number (r) between 0 and 100 can be generated. If the random number (r) is less than or equal to the calculated response rate (which was already determined to be less than the threshold probability, as discussed above), the secondary determination can be made that the request is to be sent to the particular user. If the random number (r) is greater than the calculated response rate, the secondary determination can be made that the request should not be sent to the particular user.

The analytical model can be modified and customized to the particular answering user based on the answering user's response to the request. In this manner, an analytical model can be provided for each potential answering user. Continuing with the example above, if the particular answering user positively responds to the request, the successful pseudo-count (S) can be incremented. In this case, the values in the cell 508 would be updated to provide 5.5/3.5. If the particular answering user negatively responds to the request, the unsuccessful pseudo-count (U) can be incremented. In this case, the values in the cell 508 would be updated to provide 4.5/4.5.

Figure 6:
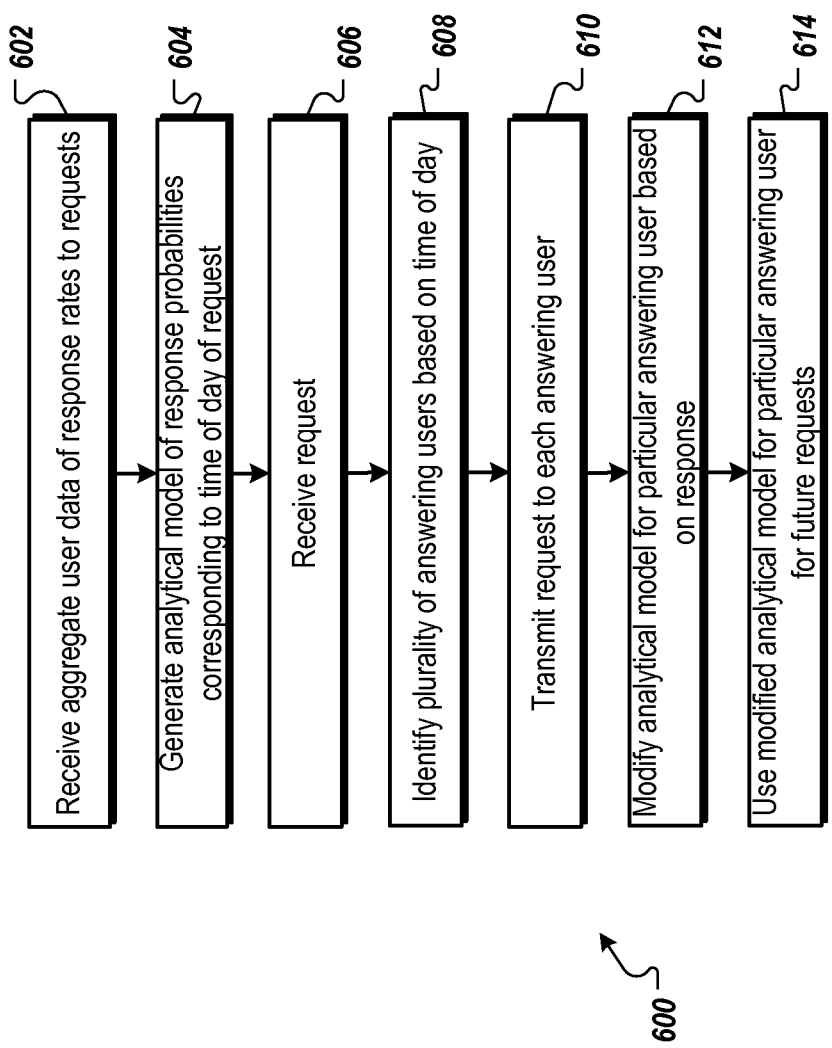
FIG. 6 is a flowchart illustrating an example process for adaptive contact window in accordance with implementations of the present disclosure.

FIG. 6 is a flowchart illustrating an example process 600 for adaptive contact window in accordance with implementations of the present disclosure. The contact window relates to a window of time during a particular day in which a user is to be provided a request. Users may have windows of time throughout the week when they are generally more responsive to requests, to which the system adapts. In some implementations, actions represented in the example process 600 may be performed using one or more computing devices (e.g., the server system 104 of FIG. 1).

Aggregate user data of response rates to requests is received (602). The aggregate user data of response rates to requests can be based on historical user data. For example, a sample of historical data can be used to determine an average response rates for all users in the sample for each hour of each day of the week.

An analytical model of response probabilities corresponding to time of day of the request is generated (604). The analytical model can include a table for response rates for each hour of each day of the week, as discussed above and with reference to the example table 500 of FIG. 5. The analytical model can be used as a base model of probabilities for each user of a user class before users provide any responses that can be used to modify or customize the model on a per-user basis. As discussed, multiple analytical models can be generated to provide base models for different user classes.

A request is received (606). As discussed, a request can include a question provided by a user to be provided to answering users for a response. The response can include an answer to the question. A plurality of answering users is identified based on the time of day of the request (608). By referring to the analytical model based on time of day, users who are more likely to respond to the question can be determined, depending on the time of day the request is received. Answering users can be those determined by using the analytical model to be above a threshold probability to respond, as discussed. In some implementations, a subset of the answering users can be identified, for example, if the number of answering users exceeds a threshold number. The subset can be determined by identifying answering users with a greater likelihood to respond to the request. Alternatively or additionally, a random subset of the answering users can be identified.

The request is transmitted to each answering user (610). Each of the users that have been determined to be likely to respond to the request is provided the request. In some implementations, where a subset of the answering users is determined for providing the request, the request is transmitted to each of the answering users in the subset.

The analytical model is modified for each particular answering user based on the particular user's response (612). Based on the user's response to the request, the analytical model is modified as discussed. Positive responses can be used to increment a corresponding successful pseudo-count (S) for the time of day corresponding to the time of the request, while negative responses can be used to increment a corresponding unsuccessful pseudo-count (U) for the time of day of the request. Neutral responses can be used to also increment the corresponding unsuccessful pseudo-count (U), or can be ignored.

The modified analytical model is used for the particular answering user for future requests (614). As the base analytical model is modified for each particular answering user, the modified analytical model can more accurately provide a probability of the particular user's response rate. Thus, when a future request is received the modified analytical model can be used to determine whether to identify the particular user as an answering user. The modified analytical model can then be further modified based on the user's responses to such future requests.

In some implementations, an analytical model can describe a probability that a user will respond to a request based on a state or transition of the user. The states of the user are actions or activities the user may be engaged in, and the transitions can be a transition between actions or activities. Example states can include writing email, browsing the Internet, browsing a specific site on the Internet, being idle, talking on the telephone, and the like. Example transitions can include transitions from browsing the Internet to writing an email, from preparing a document to writing an email, and the like. A user may be more likely to respond to requests depending on what the user is doing at the time (i.e., what state the user is in), such as browsing a social networking site as opposed to watching a video on a website. The probabilities can also be based on the transitions between the states. For example, a user may be more likely to respond to requests when she has just completed an action and is moving on to a next action. The likelihood of a response may also depend on what the two actions, or states are that are transitioned between. Thus, an analytical model can reflect the probability that a request will receive a response based on states and transitions between states.

Similar to the base analytical models discussed above, a base analytical model can be generated based on states and transitions between states. States can be generated for typical user actions and activities that interact with the system. A state can also represent that the user is engaged in activities that are unknown to the system, in other words, that the system does not know what the user is doing. Successful pseudo-counts (S) and unsuccessful pseudo-counts (U) can be assigned to each of the states, and can be used to determine a probability that a user will respond to a request when in a particular state. Successful pseudo-counts (S) and unsuccessful pseudo-counts (U) can also be assigned to each transition between each of the states, and can be used to determine a probability that a user will respond to a request when in a particular transition between states.

Figure 7:
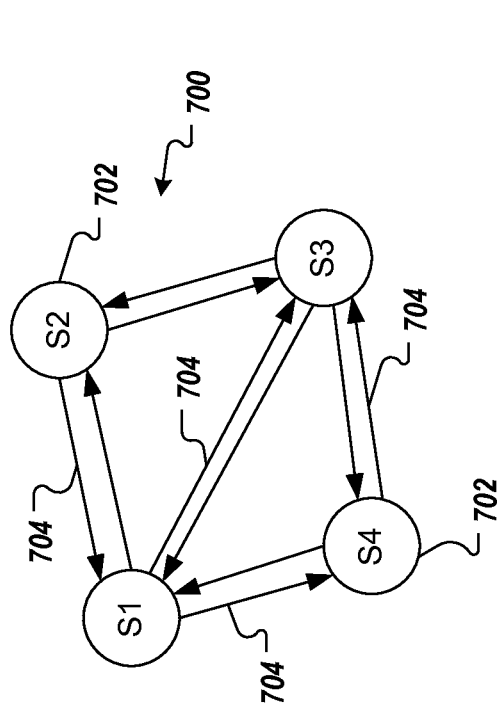
FIG. 7 depicts an example behavior-based directed graph in accordance with implementations of the present disclosure.

FIG. 7 depicts an example behavior-based directed graph 700 in accordance with implementations of the present disclosure. Each of the circles, labeled S1, S2, S3, and S4 can represent different states 702. Each of the states 702 can be assigned successful pseudo-counts (S) and unsuccessful pseudo-counts (U) that can be used to determine the probability that a user will respond to a request when in a particular state. The arrows between the states 702 can represent the transitions 704 between the states 702. Each of the arrows can be assigned successful pseudo-counts (S) and unsuccessful pseudo-counts (U) that can be used to determine the probability that a user will respond to a request when in a particular state.

For example, S1 can represent writing an email, S2 can represent browsing a social networking site, S3 can represent browsing a video site, and S4 can represent activities unknown to the system. The base analytical model can assign pseudo-counts S, U for each of the states and the transitions based on historical user data that can be used to determine the response rate, or probability that a user will respond to a request when in a particular state or a particular transition. For example, an average user may have a response rate when writing email (S1) of 10%. An example base response rate for users browsing a social networking site (S2) can be 70%. The transition between S1 and S2 can also have a base response rate, such as 80%. Thus, for an average user, providing requests may be more likely to result in a positive response when the user is browsing a social networking site or going from writing an email to browse a social networking site.

In determining whether to transmit a request to a particular user, the system can generate a response rate (i.e., probability) based on the state or transition that the particular user is in and the analytical model (e.g., the graph 700 of FIG. 7). For example, the system can identify a group of potential answering users as users that have been made available to provide respective responses to requests. For each user, the system can determine a state or transition of the user. By way of non-limiting example, and for a logged-in user that has granted permission, activity types (e.g., web-search (and subsequent browsing), email use, other application use) can be tracked. Transitions between activities can be modeled using historical data (e.g., after writing a document, the user starts an email 40% of the time; after writing an email, the user performs a web search 20% of the time). These transition probabilities can be taken into account when determining the likelihood that a user responds to a request.

For example, a user can be determined to be in the state S1. The system accesses the analytical model to determine the pseudo-counts S, U that correspond to the particular state S1. By way of non-limiting example, the values S, U can include 4.5 and 3.5, respectively. The response rate, or probability is calculated as 0.5625 (56.25%). If the probability for a particular user is less than a threshold probability, an initial determination is made that the request should not be sent to the particular user. If the probability for a particular user is equal to or greater than the threshold probability, the request is sent to the particular user.

In some implementations, and if an initial determination is made that the request should not be sent to a particular user, a secondary determination can be made. The secondary determination can be based on the probability calculated for the particular user. That is, a random number (r) between 0 and 100 can be generated. If the random number (r) is less than or equal to the calculated response rate (which was already determined to be less than the threshold probability, as discussed above), the secondary determination can be made that the request is to be sent to the particular user. If the random number (r) is greater than the calculated response rate, the secondary determination can be made that the request should not be sent to the particular user.

The analytical model can be modified and customized to the particular answering user based on the answering user's response to the request. In this manner, an analytical model can be provided for each potential answering user. Continuing with the example above, if the particular answering user positively responds to the request, the successful pseudo-count (S) can be incremented. In this case, the pseudo-count values corresponding to the state S1 would be updated to provide S equal to 5.5 and U equal to 3.5. If the particular answering user negatively responds to the request, the unsuccessful pseudo-count (U) can be incremented. In this case, the pseudo-count values corresponding to the state S1 would be updated to provide S equal to 4.5 and U equal to 4.5.

Figure 8:
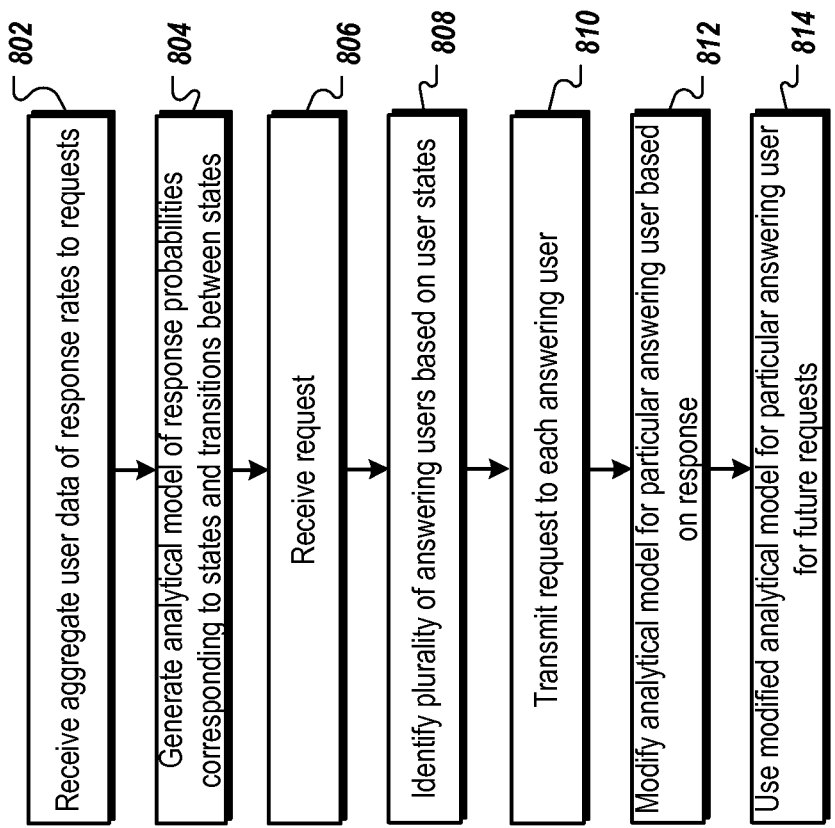
FIG. 8 is a flowchart illustrating an example process for adaptive behavior-based contact decisions in accordance with implementations of the present disclosure.

FIG. 8 is a flowchart illustrating an example process 800 for adaptive behavior-based contact decisions in accordance with implementations of the present disclosure. In some implementations, actions represented in the example process 800 may be performed using one or more computing devices (e.g., the server system 104 of FIG. 1).

Aggregate user data of response rates to requests in particular states and particular transitions is received (802). The aggregate user data of response rates to requests can be based on historical user data. For example, a sample of historical data can be used to determine an average response rates for all users in the sample for each state and transition. In some implementations, the historical data can also be used to determine the states and transitions that are included in the analytical model.

An analytical model of response probabilities corresponding to states and transitions between states is generated (804). The analytical model can include a graph for response rates for each state and each transition between states, as discussed above and with reference to the example graph 700 FIG. 7. The analytical model can be used as a base model for determining response rates, or probabilities for each user before the user provides any responses with which to modify the model.

A request is received (806). As discussed, a request can include a question provided by a user to be provided to answering users for a response. The response can include an answer to the question. A plurality of answering users is identified based on the users' states or transitions between states (808). By referring to the analytical model based on states or transitions between states, users who are more likely to respond to the question can be determined, depending on the current state or transition between states of the user. Answering users can be those determined by using the analytical model to be above a threshold probability to respond, as discussed above. In some implementations, a subset of the answering users can be identified, for example, if the number of answering users exceeds a threshold number. The subset can be determined by identifying answering users with a greater likelihood to respond to the request. Alternatively or additionally, a random subset of the answering users can be identified.

The request is transmitted to each answering user (810). Each of the users that have been determined to be likely to respond to the request is provided the request. In some implementations, where a subset of the answering users is determined for providing the request, the request is transmitted to each of the answering users in the subset.

The analytical model is modified for each particular answering user based on the particular user's response (812). Based on the user's response to the request, the analytical model is modified as discussed above. Positive responses can be used to increment a corresponding successful pseudo-count (S) for the state or transition, while negative responses can be used to increment a corresponding unsuccessful pseudo-count (U) for the state or transition. Neutral responses can be used to also increment the corresponding unsuccessful pseudo-count, or can be ignored.

The modified analytical model is used for the particular answering user for future requests (814). As the base analytical model is modified for each particular answering user, the modified analytical model can more accurately provide a probability of the particular user's response rate and a probability of the user's state. Thus, when a future request is received the modified analytical model can be used to determine whether to identify the particular user as an answering user. The modified analytical model can then be further modified based on the user's responses to such future requests.

In some implementations, the analytical models discussed herein can be combined to determine whether to transmit a request to a particular user. For example, respective response rates, or probabilities can be determined using each analytical model, as discussed above. A probability $P_{INT}$ can be determined based on one or more time interval analytical models (e.g., interval table 300 of FIG. 3), a probability $P_{TIME}$ can be determined based on a time of day analytical model (e.g., table 500 of FIG. 5) and a probability $P_{ST}$ can be determined based on a state/transition analytical model (e.g., graph 700 of FIG. 7).

By way of non-limiting example, a determination as to whether to transmit a request to a particular user can be determined based on the respective probabilities $P_{INT}$, $P_{TIME}$ and $P_{ST}$. In some implementations, if any one of $P_{INT}$, $P_{TIME}$ and $P_{ST}$ is greater than or equal to a respective threshold probability, the request is transmitted to the respective user. In some implementations, if at least two of $P_{INT}$, $P_{TIME}$ and $P_{ST}$ are greater than or equal to respective threshold probabilities, the request is transmitted to the respective user. In some implementations, if all of $P_{INT}$, $P_{TIME}$ and $P_{ST}$ are greater than or equal to respective threshold probabilities, the request is transmitted to the respective user. In some implementations, if none of $P_{INT}$, $P_{TIME}$ and $P_{ST}$ are greater than or equal to respective threshold probabilities (e.g., during an initial determination), a secondary determination can be made for each of the respective probabilities. The secondary determination can include selecting a random number and comparing the random number to each of $P_{INT}$, $P_{TIME}$ and $P_{ST}$, as discussed above.

If the request is sent to a particular user based on $P_{INT}$, $P_{TIME}$ and $P_{ST}$, one or more of the underlying analytical models can be modified based on the response to customize the underlying analytical models to the particular user. In some implementations, only the analytical models that led to transmission of the request are modified. By way of non-limiting example, if $P_{INT}$ is greater than a respective threshold probability, but $P_{TIME}$ and $P_{ST}$ are less than respective threshold probabilities, the request will be transmitted to the particular user in response to $P_{INT}$ being greater than the respective threshold probability. Based on the response of the particular user, the time interval analytical model is modified, because $P_{INT}$ triggered transmission of the request to the user, while the analytical models that provided $P_{TIME}$ and $P_{ST}$ remain unmodified.

In some implementations, all of the analytical models are modified based on a response of the particular user. By way of non-limiting example, if $P_{INT}$ is greater than a respective threshold probability, but $P_{TIME}$ and $P_{ST}$ are less than respective threshold probabilities, the request will be transmitted to the particular user in response to $P_{INT}$ being greater than the respective threshold probability. Based on the response of the particular user, all of the analytical models are modified even though $P_{TIME}$ and $P_{ST}$ did not trigger transmission of the request to the user.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For example, in some implementations, the modification of the analytical models can also be weighted so that more recent responses from a user can affect the model more than older responses. For example, a logarithmic scale can be used as a multiplier so that responses older than a threshold period can no longer affect the modified analytical model for a particular user.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementations are within the scope of the following claims. For example, the actions recited in the claims can be performed in a different order and still achieve desirable results.

What is claimed is:

1. A system comprising:
   a computing device; and
   a computer-readable medium coupled to the computing device and having instructions stored thereon which, when executed by the computing device, cause the computing device to perform operations comprising:
   receiving aggregate user data, the aggregate user data corresponding to response rate of one or more answering users responding to requests;
   processing the aggregate user data to generate an analytical model, the analytical model comprising a plurality of states, a plurality of transitions between states, and data corresponding to a probability that an average answering user will respond to a request based on at least one of a state of the average answering user and a transition between states;
   receiving a request;
   identifying a plurality of answering users;
   processing the analytical model to identify a sub-set of answering users of the plurality of answering users; and
   transmitting the request to each answering user of the sub-set of answering users.

2. The system of claim 1, wherein the operations further comprise:
   determining a response of a particular answering user of the sub-set of answering users to the request;
   modifying the analytical model based on the response to provide a modified analytical model, the modified analytical model being specific to the particular answering user; and
   in response to receiving a subsequent request, determining whether to transmit the subsequent request to the particular answering user based on the modified analytical model.

3. The system of claim 2, wherein modifying the analytical model comprises:
   determining a particular state that the particular answering user was in when the particular answering user provided the response; and
   updating data corresponding to the state based on the response.

4. The system of claim 1, wherein the data includes count data comprising a number of successful requests and a number of unsuccessful requests corresponding to requests issued during each of the plurality of states and each of the plurality of transitions.

5. The system of claim 1, wherein processing the analytical model comprises:
   for each answering user of the plurality of answering users:
      determining that the answering user is in one of a particular state or a particular transition;
      determining a number of successful requests and a number of unsuccessful requests based on the one of the particular state or the particular transition;
      calculating a probability based on the number of successful requests and the number of unsuccessful requests; and
      including the answering user in the sub-set of answering users based on the probability.

6. The system of claim 5, wherein including the answering user in the sub-set of answering users based on the probability comprises:
   comparing the probability to a threshold probability; and
   determining that the probability is greater than or equal to the threshold probability.

7. The system of claim 5, wherein including the answering user in the sub-set of answering users based on the probability comprises:
   generating a random number; and
   determining that the random number is less than or equal to the probability.

8. The system of claim 7, wherein including the answering user in the sub-set of answering users based on the probability further comprises:
  comparing the probability to a threshold probability; and
  determining that the probability is less than the threshold probability, wherein generating the random number occurs in response to determining that the probability is less than the threshold probability.

9. The system of claim 1, wherein a state comprises an activity that a user can be engaged in.

10. The system of claim 1, wherein a state comprises at least one of writing an email, browsing the Internet, browsing a specific site on the Internet, being idle, talking on a telephone, and writing a document.

11. A non-transitory computer readable storage medium encoded with a computer program, the program comprising instructions that when executed by one or more computers cause the one or more computers to perform operations comprising:
  receiving aggregate user data, the aggregate user data corresponding to response rate of one or more answering users responding to requests;
  processing the aggregate user data to generate an analytical model, the analytical model comprising a plurality of states, a plurality of transitions between states, and data corresponding to a probability that an average answering user will respond to a request based on at least one of a state of the average answering user and a transition between states;
  receiving a request; identifying a plurality of answering users;
  processing the analytical model to identify a sub-set of answering users of the plurality of answering users; and
  transmitting the request to each answering user of the sub-set of answering users.

12. A computer-implemented method comprising:
  receiving aggregate user data, the aggregate user data corresponding to response rate of one or more answering users responding to requests;
  processing the aggregate user data to generate an analytical model, the analytical model comprising a plurality of states, a plurality of transitions between states, and data corresponding to a probability that an average answering user will respond to a request based on at least one of a state of the average answering user and a transition between states;
  receiving a request;
  identifying a plurality of answering users;
  processing the analytical model to identify a sub-set of answering users of the plurality of answering users; and
  transmitting the request to each answering user of the sub-set of answering users.

* * * * *